United States Patent
Salman et al.

(10) Patent No.: US 7,136,729 B2
(45) Date of Patent: Nov. 14, 2006

(54) SUPERVISORY DIAGNOSTICS FOR INTEGRATED VEHICLE STABILITY SYSTEM

(75) Inventors: Mutasim A. Salman, Rochester Hills, MI (US); Mark N. Howell, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 123 days.

(21) Appl. No.: 10/899,210

(22) Filed: Jul. 26, 2004

(65) Prior Publication Data
US 2006/0020378 A1    Jan. 26, 2006

(51) Int. Cl.
*G01M 17/00* (2006.01)
(52) U.S. Cl. .............................. 701/29; 701/32; 701/34; 303/140; 340/438; 340/439
(58) Field of Classification Search .................. 701/29, 701/32, 33, 34, 35, 70, 76; 180/197; 303/140, 303/146, 147
See application file for complete search history.

(56) References Cited

U.S. PATENT DOCUMENTS

| 5,707,117 | A | 1/1998 | Hu et al. |
| 6,623,089 | B1 * | 9/2003 | Amberkar .................... 303/146 |
| 6,625,527 | B1 | 9/2003 | Ding et al. |

* cited by examiner

Primary Examiner—Gertrude A. Jeanglaude
(74) Attorney, Agent, or Firm—Kathryn A. Marra

(57) ABSTRACT

A supervisory diagnostics system and related method for providing vehicle diagnostics for an integrated vehicle stability system that monitors the state of health of sensors, actuators, vehicle sub-system and communication sub-systems that are used in the stability control system. The diagnostics system employs an algorithm to determine whether the various sensors, actuators and sub-systems are operating properly. The algorithm determines whether the components and sub-systems are outputting valid signals at a component level. The algorithm also determines whether a bias of the sensors is below a predetermined limit. The algorithm further determines whether a comparison between the outputs of redundant sensors is below a predetermined threshold for a predetermined period of time. The system also performs a state of health analytical comparison of all the system signals. The system will go in to a fail-safe mode if a fault is detected.

24 Claims, 2 Drawing Sheets

SUPERVISORY DIAGNOSTICS FOR INTEGRATED VEHICLE STABILITY SYSTEM

BACKGROUND OF THE INVENTION

1. Field of the Invention

This invention relates generally to a system and method for diagnostics monitoring of an integrated vehicle stability system and, more particularly, to a system and method for diagnostics monitoring of an integrated vehicle stability system at the supervisory level, including detecting and isolating faults of sensors, actuators and vehicle control sub-systems and communication systems in a fast and reliable manner.

2. Discussion of the Related Art

Diagnostics monitoring for vehicle stability systems is an important vehicle design consideration so as to be able to detect system faults quickly, and isolate the faults for maintenance purposes. These stability systems typically employ various types of sensors including yaw rate sensors, lateral acceleration sensors and steering hand wheel angle sensors that are used to provide the stability control of the vehicle. For example, certain vehicle stability systems employ automatic braking in response to an undesired turning or yaw rate of the vehicle. Certain vehicle stability systems also employ active front-wheel or rear-wheel steering that assists the vehicle operator in steering the vehicle in response to detected rotation of the steering wheel. Other vehicle stability systems employ active suspension stability systems that change the vehicle suspension in response to road conditions and vehicle operating conditions.

If any of the sensors and actuators associated with these stability systems fail, it is desirable to quickly detect the fault and activate fail-safe strategies so as to prevent the system from improperly responding to a perceived condition. It is also desirable to isolate the defective sensor or actuator for maintenance and replacement purposes, and also select the proper action for the problem. Thus, it is necessary to monitor the various sensors, actuators and components employed in these stability systems to identify a failure.

SUMMARY OF THE INVENTION

In accordance with the teachings of the present invention, a supervisory diagnostics system and related method is disclosed for providing vehicle diagnostics for an integrated vehicle stability system. The diagnostics system monitors sensors, actuators and vehicle sub-systems that are used in the stability system. In one embodiment, the stability system includes an active braking control sub-system, an active front-wheel steering assist sub-system and a semi-active suspension sub-system. The stability system includes first and second yaw rate sensors for sensing the yaw rate of the vehicle and first and second lateral acceleration sensors for sensing the lateral acceleration of the vehicle. The stability system also indirectly measures the road wheel angle of the vehicle.

The diagnostics system employs an algorithm for determining whether the various sensors, actuators and sub-systems are operating properly. The algorithm checks whether the components and sub-systems are outputting valid signals at a component level, and whether the rate of change and range of the signals are valid. Further, the algorithm determines whether the yaw rate sensor signal and the road wheel angle measurement signal have a bias, and if so, performs a calibrating or centering operation. The algorithm also determines whether the bias of the yaw rate sensor signal, the lateral acceleration sensor signal and the road wheel angle measurement signal are below a predetermined limit. The algorithm further determines whether a comparison between the outputs of the yaw rate sensors and a comparison between the lateral acceleration sensors is below a predetermined threshold for a predetermined period of time. The system also performs a state of health analytical comparison of all the system signals to determine whether the system is operating properly.

If the components or the sub-systems are not outputting a valid signal, or the rate of change or range of the component and sub-system signals are not valid, or the bias of the yaw rate sensor signals, the lateral acceleration sensor signals or the road wheel angle measurement signal are not below the predetermined limit, or the comparison between the outputs of the yaw rate sensors or the lateral acceleration sensors is greater than the predetermined threshold, or the analytical signal analysis is invalid, then the algorithm puts the diagnostics system in a fail-safe mode for the particular fault detected.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a system and method for monitoring the state of health, detecting and isolating faults and taking the proper action for the sensors, actuators, vehicle sub-systems and communication systems at a supervisory level in an integrated vehicle stability control system is merely exemplary in nature, and is in no way intended to limit the invention or its applications or uses.

Figure 1:
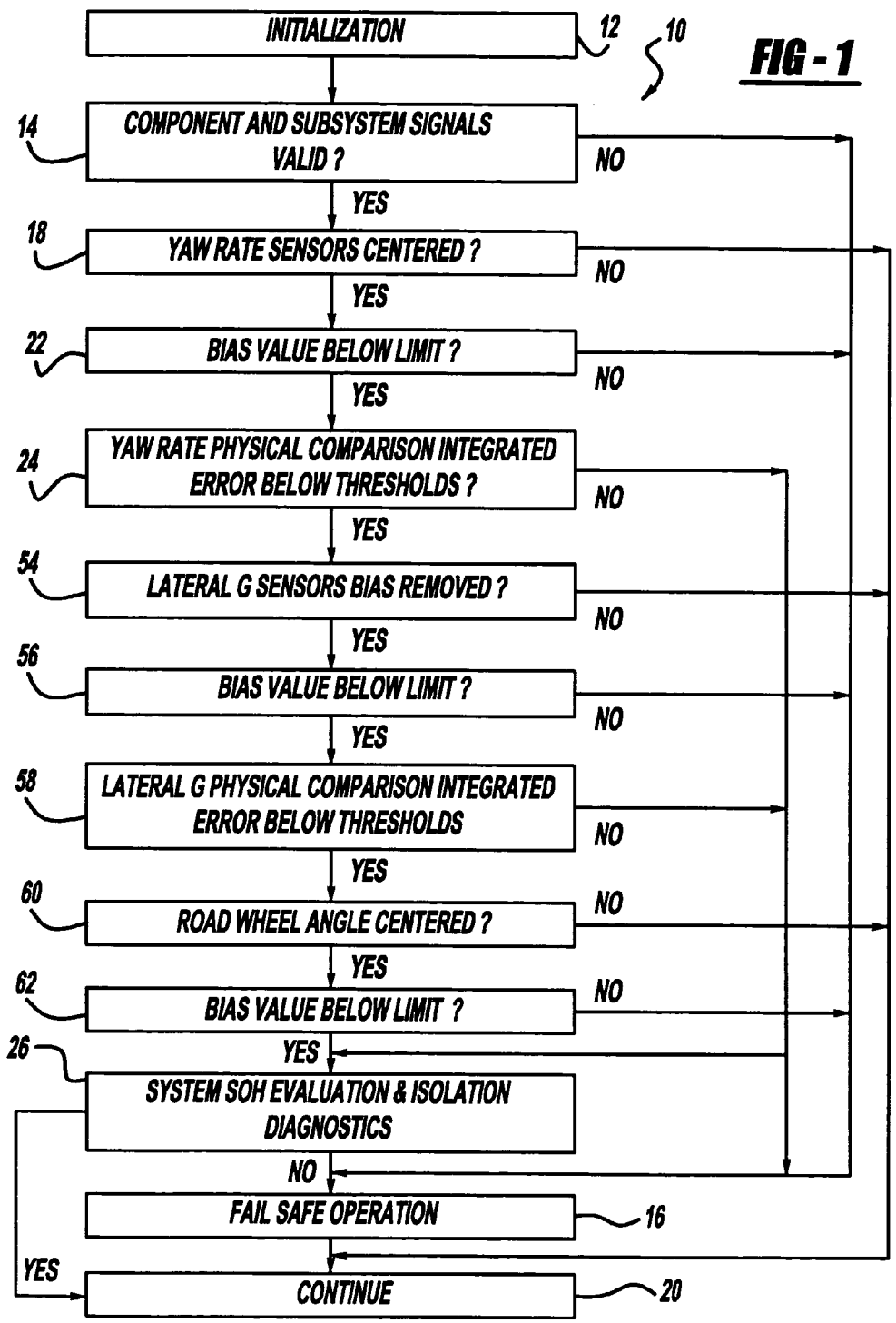
FIG. 1 is a flow chart diagram of a supervisory diagnostics algorithm that monitors the state of health, detects and isolates faults and takes the proper action for the sensors, actuators and vehicle sub-systems in an integrated vehicle stability control system, according to an embodiment of the present invention.

FIG. 1 is a flow chart diagram 10 showing a technique for monitoring the state of health, detecting and isolating faults and taking the proper action for sensors, actuators, vehicle sub-systems and communication sub-systems in an integrated vehicle stability control system, according to the invention. In one embodiment, the integrated control system includes an active braking control sub-system, an active front-wheel steering assist sub-system and a semi-active suspension sub-system, known to those skilled in the art. The integrated control system includes two vehicle yaw rate sensors for measuring the vehicle yaw rate, and two vehicle lateral acceleration sensors for measuring the lateral acceleration or slip of the vehicle. The dual sensors are provided for physical redundancy purposes and provide a fast and reliable detection of faults, as will be discussed below. The control system also includes a hand wheel position sensor and a motor actuator position sensor that indirectly determine the road wheel angle.

Each component and sub-system includes its own diagnostics provided by the component supplier that is checked by the algorithm of the present invention in a supervisory manner. The supervisory diagnostics algorithm collects the diagnostics signals from the sub-systems and the components, and uses information fusion to detect and isolate faults in the system. The supervisory diagnostics algorithm receives controller area network (CAN) communications signals from the components and the sub-systems. These signals include signals from the two yaw rate sensors, the two lateral acceleration sensors, the road wheel angle measurement signal, a reference vehicle speed signal, a vehicle roll rate signal, a vehicle pitch rate, normal forces, etc. As will be discussed in detail below, diagnostics algorithm provides multi-layer diagnostics for the integrated control system.

The algorithm performs initialization steps at box 12 to set the various parameters and variables. Each of the several sensors, actuators and sub-systems that the stability control system is monitoring provides its own digital diagnostics signals at the component level as provided by the manufacturer. The algorithm determines whether the component diagnostics signals from all the various sub-systems, sensors and actuators are valid at box 14. If any of the sub-system or component signals not valid, then the algorithm puts the control system in a fail-safe mode at box 16. The algorithm will know which sub-system or component is faulty and it will know, based on a predetermined look-up table, what action is to be taken in the fail-safe mode for that detected fault. If the diagnostic signals are valid, then the signals are filtered and checked for range and rate of change at the box 14. If the range and rate of change of the signals are within the pre-described limits, then the signals from the components and sub-systems are considered valid, otherwise the system is put in the fail-safe mode at the box 16.

The algorithm then determines whether both of the yaw rate sensors are centered or calibrated at box 18. The output of the yaw rate sensors should be a certain value for a certain vehicle condition, such as a zero yaw rate if the vehicle is not turning. The difference between the actual sensor output and the proper sensor output is the sensor bias. The system will center the output of the sensor if the output does not match the proper output so that the sensor is calibrated. If the yaw rate sensor outputs are not centered at the box 18, then the algorithm proceeds to a continue box 20 where the algorithm goes through the process of centering or calibrating the output of the yaw rate sensors. When the yaw rate sensors are centered, the algorithm determines whether the absolute value of the bias is below a predetermined threshold at box 22. If the bias is above the threshold, then the sensors are not operating properly or within the prescribed limits, and the algorithm puts the system in the fail-safe mode at the box 16 for that particular fault.

If the absolute value of the bias for both yaw rate sensors is below the threshold at the box 22, and thus valid, the algorithm compares the output of the two yaw rate sensors at box 24 to determine if the difference between the sensor outputs is below a predetermined threshold. If the two sensor outputs are nearly the same, then the algorithm assumes that both sensors are working properly. However, if the difference between the two sensor outputs is greater than the threshold, then the algorithm assumes that one of the two sensors is not operating properly, and the algorithm immediately goes into the predetermined fail-safe mode at box 16 for that fault.

Figure 2:
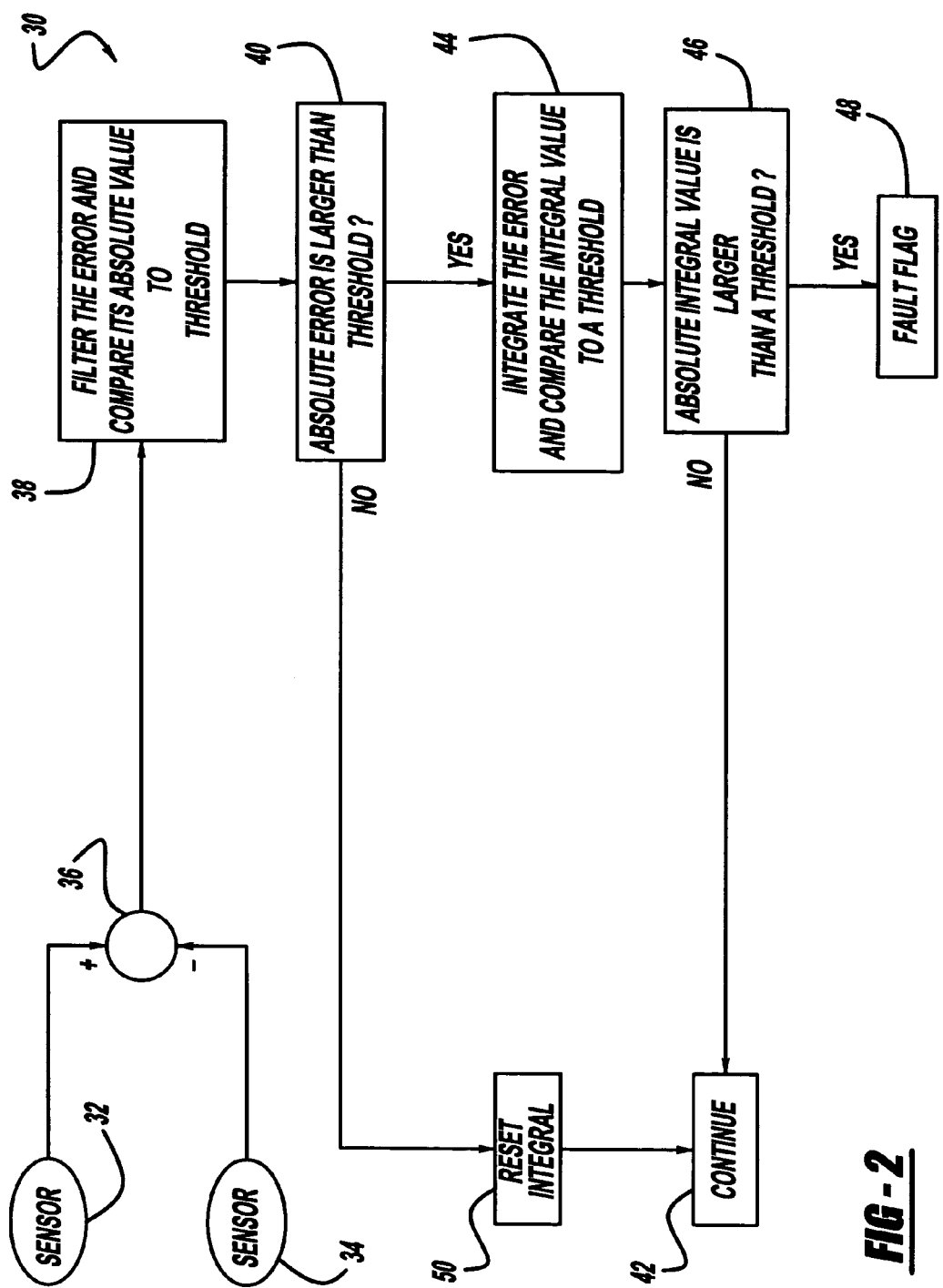
FIG. 2 is a block diagram showing a process for a physical sensor output comparison used in the diagnostics algorithm shown in FIG. 1, according to the invention.

FIG. 2 is a block diagram showing one technique that the algorithm can use to compare the outputs of the two sensors at the box 24. Sensors 32 and 34 represent the two yaw rate sensors (or the two lateral acceleration sensors). The output signals of the sensors 32 and 34 are compared by a comparator 36. The error signal or difference between the two output signals from the sensors 32 and 34 is filtered, and the absolute value of the filtered error signal is compared to a predetermined first threshold at box 38. The algorithm then determines if the absolute value of the error signal is greater than the first threshold at box 40. If the absolute value of the error signal is not greater than the first threshold, the algorithm resets an error integral at box 50, and continues at the box 42 to return to the next step in the flow chart diagram 10.

If, however, the absolute value of the error signal is larger than the first threshold, the algorithm integrates the error signal at box 44. Because of noise in the system and the like, the absolute value of the error signal may temporarily go above the first threshold. However, the error signal must remain above the first threshold for a period of time in order for there to be a fault. The integrated error signal is reset to zero at the box 50 if it falls below the first threshold. The absolute integrated error value is compared to a second threshold at the box 46. If the integrated error value does not reach the second threshold before it falls below the first threshold, then the sensors 32 and 34 are determined to be operating properly and the algorithm continues at the box 42. If, however, the absolute integrated error value becomes greater than the second threshold at the box 46, then the algorithm sets a fault flag at box 48 and the system goes into the fail-safe mode at the box 16.

If the error signal between the outputs of the two yaw rate sensors 32 and 34 is greater than the second threshold, then the algorithm also does a system-wide state of health (SOH) evaluation and isolation diagnostics check at box 26. This diagnostics check can be any diagnostics check suitable for the purposes described herein. The state of health and isolation diagnostics check can use analytical redundancy to assure that the overall system state of health of the vehicle is as expected and there are no abnormal behaviors. The state of health isolation diagnostics can also identify which of the redundant sensors may be faulty. The state of health isolation diagnostics process also has the capability of isolating a fault that has been detected earlier. One suitable diagnostic check is disclosed in commonly owned U.S. patent application Ser. No. (GP-304752).

Once the output of the two yaw rate sensors have been compared at the box 24 and the error signal is below the thresholds as discussed above, the algorithm performs the same operations for the lateral acceleration sensors. Particularly, the algorithm determines whether a bias of the lateral acceleration sensors has been removed (calibrated) at box 54, and if not, goes through the process of removing the bias at the box 20. If the bias has been removed at the box 54, the algorithm determines whether the removed bias for both the lateral acceleration sensors is below a particular limit at box 56. If the removed bias is above the threshold, the algorithm puts the vehicle in the fail-safe mode at the box 16 for that fault. If the removed bias is below the threshold, then the algorithm compares the outputs of the two lateral acceleration sensors at box 58 using the flow chart diagram 30, where the sensors 32 and 34 are now the lateral acceleration sensors, to determine whether one of the sensors is faulty in a quick manner. If the integrated absolute value of the error signal between the outputs of the two lateral acceleration sensors is greater than the second threshold, the algorithm also determines the system's state of health at the box 26, as discussed above.

The algorithm then centers the road wheel angle measurement signal at box 60. If the road wheel angle measurement signal is not centered, the algorithm centers the measurement at the box 20. The algorithm then determines whether the bias of the road wheel angle measurement signal is below a predetermined limit at box 62, and if not, puts the vehicle in the fail-safe mode at the box 16 for that fault.

If all of the sensors are operating properly, then the algorithm determines the systems state of health evaluation and isolation diagnostics at the box 26 for the entire system. If the state of health is determined to be within the desired limits, then the algorithm loops back to perform the process all over again at the continue box 20. Otherwise, the algorithm puts the entire system in the vehicle fail-safe operation for the identified fault at the box 16.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for performing a diagnostic check of an integrated vehicle stability system, said method comprising:
   providing at least one primary component and at least one secondary component for sensing an operation of at least one vehicle characteristic;
   determining whether an output of the at least one primary component and an output of the at least one secondary component are valid;
   comparing the output of the at least one primary component and the output of the at least one secondary component to determine whether a difference between the outputs is below a predetermined threshold;
   determining whether a bias of the at least one primary component and a bias of the at least one secondary component is below a predetermined limit; and
   putting the vehicle stability system in a fail-safe mode if the at least one primary component or the at least one secondary component is not outputting a valid signal, if the bias of the at least one primary component and the at least one secondary component is above the predetermined limit, or the difference between the outputs of the at least one primary component and the at least one secondary component is greater than the predetermined threshold.

2. The method according to claim 1 wherein comparing an output of the at least one primary component and an output of the at least one secondary component includes integrating the difference between the outputs overtime.

3. The method according to claim 1 further comprising centering the bias of the least one primary component and the at least one secondary component.

4. The method according to claim 1 wherein determining whether an output of the at least one primary component and an output of the at least one secondary component are valid includes determining whether the rate of change and the range of the outputs are within predetermined limits.

5. The method according to claim 1 wherein providing at least one primary component and at least one secondary component includes providing a first yaw rate sensor and a second yaw rate sensor for sensing a yaw rate of the vehicle.

6. The method according to claim 1 wherein providing at least one primary component and at least one secondary component includes providing a first lateral acceleration sensor and a second lateral acceleration sensor for sensing a lateral acceleration of the vehicle.

7. The method according to claim 6 further comprising determining whether a bias of the first and second lateral acceleration sensors has been removed.

8. The method according to claim 1 further comprising measuring a road wheel angle of the vehicle.

9. The method according to claim 1 further comprising determining a state of health evaluation and isolation diagnostics of the system if the difference between the outputs of the at least one primary component and the at least one secondary component is above the predetermined threshold.

10. The method according to claim 1 wherein the integrated vehicle stability system includes an active braking control sub-system, an active front-wheel steering assist sub-system and a semi-active suspension sub-system.

11. A method for performing a diagnostics check for an integrated vehicle stability system, said method comprising:
    providing a first yaw rate sensor and a second yaw rate sensor for sensing a yaw rate of the vehicle;
    providing a first lateral acceleration sensor and a second lateral acceleration sensor for sensing the lateral acceleration of the vehicle;
    measuring a road wheel angle of the vehicle;
    determining whether the first and second yaw rate sensors, the first and second lateral acceleration sensors and the road wheel angle measurement are outputting valid signals;
    determining whether a bias of the first and second yaw rate sensors, a bias of the first and second acceleration sensors and a bias of the road wheel measurement are below a predetermined limit;
    comparing outputs of the first and second yaw rate sensors to determine whether the difference between the outputs of the first and second yaw rate sensors is below a predetermined threshold;
    comparing outputs of the first and second lateral acceleration sensors to determine whether the difference between the outputs of the first and second lateral acceleration sensors is below a predetermined threshold; and
    putting the vehicle stability system in a fail-safe mode if the first and second yaw rate sensor or the first and second lateral acceleration sensors or the road wheel angle measurement are not outputting a valid signal, or the bias of the first and second yaw rate sensors or the bias of the first and second lateral acceleration sensors or the bias of the road wheel angle measurement is above the predetermined limit, or the difference between the outputs of the first and second yaw rate sensors or the outputs of the first and second lateral acceleration sensors is greater than the predetermined threshold.

12. The method according to claim 11 wherein comparing an output of the first and second yaw rate sensors and comparing an output of the first and second lateral acceleration sensors includes integrating the difference between the outputs of the first and second yaw rate sensors and the outputs of the first and second lateral acceleration sensors over time.

13. The method according to claim 11 wherein determining whether the first and second yaw rate sensors, the first and second lateral acceleration sensors and the road wheel angle measurement are outputting valid signals includes determining whether the rate of change and the range of the output signals are within predetermined limits.

14. The method according to claim 11 further comprising determining a state of health evaluation and isolation diagnostics of the system if the difference between the outputs of the first and second yaw rate sensors and the outputs of the first and second lateral acceleration sensors are above the predetermined threshold.

15. The method according to claim 11 wherein the integrated vehicle stability system includes an active braking control sub-system, an active front-wheel steering assist sub-system and a semi-active suspension sub-system.

16. A diagnostics system for performing a diagnostics check for an integrated vehicle stability system, said diagnostics system comprising:
at least one primary component and at least one secondary component for sensing the operation of at least one vehicle characteristic;
means for determining whether the at least one primary component and the at least one secondary component are outputting a valid signal;
means for comparing an output of the at least one primary component and an output of the at least one secondary component to determine whether a difference between the outputs of the components is below a predetermined threshold;
means for determining whether a bias of the at least one primary component and the at least one secondary component is below a predetermined limit; and
means for putting the vehicle stability system in a fail-safe mode if the at least one primary component or the at least secondary component are not outputting a valid signal, if the bias of the at least one primary component and the at least one secondary component is above the predetermined limit, or the difference between the outputs of the at least one primary component and the at least one secondary component is greater than the predetermined threshold.

17. The diagnostics system according to claim 16 wherein the means for comparing an output of the at least one primary component and an output of the at least one secondary component includes means for integrating the difference between the outputs over time.

18. The diagnostics system according to claim 16 wherein the means for determining whether the at least one primary component and the at least one secondary component are outputting a valid signal includes means for determining whether the rate of change and the range of the output signals are within predetermined limits.

19. The diagnostics system according to claim 16 wherein the at least one primary component and the at least one secondary component are a first yaw rate sensor and a second yaw rate sensor for sensing a yaw rate of the vehicle.

20. The diagnostics system according to claim 16 wherein the at least one primary component and the at least one secondary component are a first lateral acceleration sensor and a second lateral acceleration sensor for sensing a lateral acceleration of the vehicle.

21. The diagnostics system according to claim 20 further comprising means for determining whether the bias of the first and second lateral acceleration sensors has been removed, said means for putting the vehicle stability system in the fail-safe mode putting the vehicle stability system in the fail-safe mode if the bias has been removed.

22. The diagnostics system according to claim 16 further comprising means for measuring the road wheel angle of the vehicle.

23. The diagnostics system according to claim 16 further comprising means for determining a state of health evaluation and isolation diagnostics of the system, said means for determining a state of health evaluation and isolation diagnostics of the system determining a state of health evaluation and isolation diagnostics of the system if the difference between the outputs of the at least one primary component and the at least one secondary component is above the predetermined threshold.

24. The diagnostics system according to claim 16 wherein the integrated vehicle stability system includes an active braking control sub-system, an active front-wheel steering assist sub-system and a semi-active suspension sub-system.

* * * * *